United States Patent
Ren et al.

(10) Patent No.: US 11,365,294 B2
(45) Date of Patent: Jun. 21, 2022

(54) METHOD TO SYNTHESIZE GRAPHENE-BASED AMPHIPHILIC JANUS NANOSHEETS

(71) Applicant: University of Houston System, Houston, TX (US)

(72) Inventors: Zhifeng Ren, Pearland, TX (US); Dan Luo, Houston, TX (US); Feng Wang, Houston, TX (US)

(73) Assignee: UNIVERSITY OF HOUSTON SYSTEM, Houston, TX (US)

( * ) Notice: Subject to any disclaimer, the term of this patent is extended or adjusted under 35 U.S.C. 154(b) by 261 days.

(21) Appl. No.: 16/636,628

(22) PCT Filed: Jul. 27, 2018

(86) PCT No.: PCT/US2018/044013
§ 371 (c)(1),
(2) Date: Feb. 4, 2020

(87) PCT Pub. No.: WO2019/027817
PCT Pub. Date: Feb. 7, 2019

(65) Prior Publication Data
US 2020/0377675 A1   Dec. 3, 2020

Related U.S. Application Data

(60) Provisional application No. 62/541,213, filed on Aug. 4, 2017.

(51) Int. Cl.
*C08J 3/215* (2006.01)
*C01B 32/198* (2017.01)
*B82Y 40/00* (2011.01)

(52) U.S. Cl.
CPC .......... *C08J 3/215* (2013.01); *C01B 32/198* (2017.08); *B82Y 40/00* (2013.01); *C01P 2004/24* (2013.01); *C08J 2303/00* (2013.01)

(58) Field of Classification Search
CPC ..... C08J 3/215; C08J 2303/00; C01B 32/198; C01B 32/182; C01B 2204/00;
(Continued)

(56) References Cited

U.S. PATENT DOCUMENTS

2015/0299240 A1* 10/2015 Cheng .................. C01B 25/26
428/402

FOREIGN PATENT DOCUMENTS

| CN | 103449429 A | 12/2013 | |
|---|---|---|---|
| WO | 2017/015120 A1 | 1/2017 | |
| WO | WO 2017/015120 | * 1/2017 | ............. C01B 31/00 |

OTHER PUBLICATIONS

A, et al., Starch/polylactide sustainable composites: Interface tailoring with graphene oxide, Composites: Part A 2015; 69: 247-254 (Year: 2015).*

(Continued)

*Primary Examiner* — Daniel C. McCracken
(74) *Attorney, Agent, or Firm* — Conley Rose, P.C.

(57) ABSTRACT

A facile and scalable method to prepare graphene-based amphiphilic Janus nanosheets with high efficiency utilizing the formation of hydrogen bonding to immobilize graphene oxide (GO) on the surfaces of starch microspheres. After selective functionalization of the exposed surface using alkylamine, amphiphilic Janus nanosheets (AJN) were obtained by releasing the nanosheets from the starch microspheres.

20 Claims, 7 Drawing Sheets

(58) Field of Classification Search
CPC ............ C01B 2204/02; C01B 2204/04; C01B 2204/06; C01B 2204/065; C01B 2204/20; C01B 2204/22; C01B 2204/24; C01B 2204/26; C01B 2204/28; C01B 2204/30; C01B 2204/32; C01B 32/20; C01B 32/205; C01B 32/21; C01B 32/215; C01B 32/22; C01B 32/225; C01B 32/23; B82Y 40/00; C01P 2004/24
See application file for complete search history.

(56) References Cited

OTHER PUBLICATIONS

Dreyer, et al., The chemistry of graphene oxide, Chem. Soc. Rev. 2010; 39: 228-240 (Year: 2010).*

International Patent Application No. PCT/US2018/044013 International Search Report and Written Opinion dated Sep. 26, 2018 (13 pages).

Luo et al., "Nanofluid of graphene-based amphiphilic Janus nanosheets for tertiary or enhanced oil recovery: High performance at low concentration," Proceedings of National Academy of Sciences of the United States of America, vol. 113, No. 28, Jul. 12, 2016, pp. 7711-7716.

Luo et al., "Synthesis of graphene-based amphiphilic Janus nanosheets via manipulation of hydrogen bonding," Carbon, vol. 126, Oct. 3, 2017, pp. 105-110.

* cited by examiner

METHOD TO SYNTHESIZE GRAPHENE-BASED AMPHIPHILIC JANUS NANOSHEETS

CROSS-REFERENCE TO RELATED APPLICATIONS

The present application is a National Phase Entry of, and claims priority to PCT Application No. PCT/US2018/044013, filed Jul. 27, 2018, which claims priority to U.S. provisional application Ser. No. 62/541,213, filed Aug. 4, 2017, the entire contents of each being hereby incorporated herein by reference in their entirety for all purposes.

STATEMENT REGARDING SPONSORED RESEARCH

This work was funded in part by the US Department of Energy under grant DOE DE-SC0010831. The Government may be entitled to rights in this matter.

TECHNICAL FIELD

This disclosure relates to a method for synthesizing graphene-based amphiphilic Janus nanosheets.

BACKGROUND

Amphiphilic Janus particles can act as solid surfactants due to their asymmetric surface wettability, which allows them to be positioned at the immiscible liquid interfaces for relatively longer periods of time than that of homogeneous particles (Binks, B. P. Curr. Opin, Colloid Interface Sci., 2002, 7, 21; and Kumar, A.; Park, B. J.; Tu, F.; Lee, D. Soft Matter, 2013, 9, 6604). These stimuli-responsive molecular amphiphiles are able to assemble into different structures, generate emulsions with different morphologies, and also induce phase inversion emulsification (Tu, F.; Lee, D. J. Am. Chem. Soc., 2014, 136, 9999; and Tu, F.; Lee, D. Chem. Commun., 2014, 50, 15549).

With appropriately decorated catalysts, amphiphilic Janus particles can therefore increase the yield and selectivity of reactions between two immiscible phases by performing interfacial catalysis (Huang, X.; Wang, Y.; Liao, X.; Shi, B. Chem. Commun., 2009, 4687; Crossley, S.; Faria, J.; Shen, M.; Resasco, D. E. Science, 2010, 327, 68; and Pera-Titus, M.; Leclercq, L.; Clacens, J. M.; Campo, F. D.; Nardello-Ratay, V. Angew. Chem. Int. Ed., 2015, 54, 2006). Moreover, when dispersed in single phase, the interactive forces generated between amphiphilic Janus particles triggers self-assembling to build controllable architectures (Chen, Q.; Whitmer, J. K.; Jiang, S.; Bae, S. C.; Luijten, E.; Granick, S. Science, 2011, 331, 199; and Chen, Q.; Bae, S. C.; Granick, S. Nature, 2011, 469, 381). In addition, simple nanofluids of amphiphilic Janus nanosheets with low concentrations were also found to effectively enhance underground oil recovery.

In terms of preparation of amphiphilic Janus particles, typical methods such as microfluidic (Roh, K. H.; Martin, D. C.; Lahann, J. Nat. Mater., 2005, 4, 759; and Nie, Z.; Li, W.; Seo, M.; Xu, S.; Kumacheva, E. J. Am. Chem. Soc., 2006, 128, 9408), phase separation (Erhardt, R.; Zhang, M.; Böker, A.; Zettl, H.; Abetz, C.; Frederik, P.; Krausch, G.; Abetz, V.; Müller, A. H. E. J. Am. Chem. Soc., 2003, 125, 3260; Kim, J. W.; Larsen, R. J.; Weitz, D. A. J. Am. Chem. Soc., 2006, 128, 14374; Min, N. G.; Kim, B.; Lee, T. Y.; Kim, D.; Lee, D. C.; Kim, S. H. Langmuir, 2015, 31, 937; and Wang, X.; Feng, X.; Ma, G.; Yao, L.; Ge, M. Adv. Mater., 2016, 28, 3131) masking (Hong, L.; Jiang, S.; Granick, S. Langmuir, 2006, 22, 9495; Zhang, L.; Yu, J.; Yang, M.; Xie, Q.; Peng, H.; Liu, Z. Nat. Commun., 2013, 4: 1443; Wu, H.; Yi, W.; Chen, Z.; Wang, H.; Du, Q. Carbon, 2015, 93, 473) and click reaction (Bradley, L. C.; Stebe, K. J.; Lee, D. J. Am. Chem. Soc., 2016, 138, 11437) have been reported so far. However, in order to produce amphiphilic Janus particles starting from chemical homogeneous nanosheets in large quantities, the fabrication of nanometer-level thickness channels severely limits the viability of microfluidic method (Dendukuri, D.; Pregibon, D. C.; Collins, J.; Hatton, T. A.; Doyle, P. S. Nat. Mater., 2006, 5, 365). Often, a phase separation method was used to obtain soft Janus particles; while click reactions restrict the chemical features of synthesized Janus particles and are thus narrowed to specific applications (Thirumurugan, P.; Matosiuk, D.; Jozwiak, K. Chem. Rev., 2013, 113, 4905). When scaling up with proper tuning, the formation of emulsion template, and masking method can achieve amphiphilic Janus particles in a relatively large quantity, although particles are needed to stabilize the monolayer for selective modification.

Previously, a wax in water emulsion template masking method was used to synthesize graphene-based amphiphilic Janus nanosheets (AJN). In brief, graphite was firstly exfoliated and oxidized to graphene oxide (GO) (Marcano, D. C.; Kosynkin, D. V.; Berlin, J. M.; Sinitskii, A.; Sun, Z.; Slesarev, A.; Alemany, L. B.; Lu, W.; Tour, J. M. ACS Nano, 2010, 4, 4806; Xu, H.; Xie, L.; Wu, D.; Hakkarainen, M. ACS Sustainable Chem. Eng., 2016, 4, 2211; Shang, J.; Ma, L.; Li, J.; Ai, W.; Yu, T.; Gurzadyan, G. G. Sci. Rep., 2012, 2: 792). Wax was then stirred with GO in water for a few hours to generate the Pickering emulsion at a temperature above the melting point of wax. After cooling down, wax microspheres covered with GO were obtained. Single-side surface hydrophobization with alkylamine was conducted in ethanol for 12 hours, followed by dissolving wax microspheres with organic solvents, e.g., chloroform or toluene. However, the yield was still low (7.5% considering the feeding of GO). Moreover, the large amount of organic solvents used to dissolve the wax raised health concerns. From the economic and environmental perspective, it is urgent to find alternative methods to synthesize a large amount of AJN in an economic way for industrial applications, e.g., applications in oil and gas industry.

Thus, new methods of synthesizing Amphiphilic Janus Nanosheets and surfactants comprising such Amphiphilic Janus Nanosheet are desirable in the field. As such, and disclosed herein are embodiments of new methods synthesizing such Amphiphilic Janus Nanosheet, therefore addressing such issues.

BRIEF DESCRIPTION OF THE DRAWINGS

For a more complete understanding of the present disclosure, reference will now be made to the accompanying drawings/figures in which.

SUMMARY OF THE DISCLOSURE

Disclosed herein in one embodiment is a method of making a graphene-based Amphiphilic Janus Nanosheet (AJN), comprising: (a) mixing graphene oxide (GO) and starch microspheres in water, and forming a GO-on-starch microsphere; (b) hydrophobizing a first surface of the GO-on-starch microsphere and forming a hydrophobized GO-on-starch microsphere; and (c) releasing the starch microsphere from the hydrophobized GO-on-starch microsphere and forming an Amphiphilic Janus Nanosheet (AJN), wherein the AJN is in at least a 70% yield. In some embodiments of the method the graphene oxide is two dimensional, and in other embodiments the graphene oxide is a sheet.

In another embodiment of the method of making a graphene-based Amphiphilic Janus Nanosheet (AJN), forming a GO-on-starch microsphere is by immobilizing the GO to the starch microsphere by hydrogen bonding. In a further embodiment of the method of making a graphene-based Amphiphilic Janus Nanosheet (AJN) the starch microspheres are tapioca starch microspheres.

In another embodiment of the method of making a graphene-based Amphiphilic Janus Nanosheet (AJN), the mixing graphene oxide (GO) and starch microspheres in water, is for 1-20 hours at room temperature, and in a further embodiment the method comprises washing the GO-on-starch microsphere with water and ethanol prior to step (c). In another embodiment of the method of making a graphene-based Amphiphilic Janus Nanosheet (AJN), the hydrophobizing comprises conjugating alkylamine to a single-side surface of the GO-on-starch microsphere, and in a further embodiment hydrophobizing comprises conjugating of alkylamine to GO-on-starch by a nucleophilic substitution.

In one embodiment of the method of making a a graphene-based Amphiphilic Janus Nanosheet (AJN), releasing further comprises sonication and heating, and in another embodiment of the method further comprises after step (c) separating the starch microspheres from the Amphiphilic Janus Nanosheet (AJN) by phase separation in ethanol; and in a still further embodiment the releasing is in a non-aqueous environment. In another embodiment, the method further comprises conjugating a hydrophilic species to the Amphiphilic Janus Nanosheet (AJN), and in one embodiment the method further comprising adding the Amphiphilic Janus Nanosheet to a first solvent to form an Amphiphilic Janus Nanosheet nanofluid.

Disclosed herein in another embodiment, is a an Amphiphilic Janus Nanosheet (AJN) wherein the AJN comprises: a two dimensional graphene oxide sheet, wherein the graphene oxide sheet comprises a first surface and a second surface, wherein the first surface comprises at least one of a first functionalized oxygen-rich functional group or a second functionalized oxygen-rich functional group; and the second face comprises at least one of the first functionalized oxygen-rich functional group, or the second functionalized oxygen-rich functional group, and wherein the first functionalized oxygen-rich functional group; and a second functionalized oxygen-rich functional group are one of a hydrophobic group or a hydrophilic group. In another embodiment, a surfactant is disclosed, wherein the surfactant, comprises an Amphiphilic Janus Nanosheet (AJN) as described by any one of the embodiments disclosed herein, and a solvent, wherein the surfactant forms a climbing film in an oil/water mixture. In one embodiment of the surfactant, the oil/water mixture is a hydrocarbon/brine solution, and in another embodiment the surfactant forms an elastic interfacial film at a hydrophobic/hydrophilic interface. In a further embodiment of the surfactant, the climbing film is formed in a geologic formation comprising a hydrocarbon, and in another embodiment of the surfactant, the elastic interfacial film at the hydrophobic/hydrophilic interface releases the hydrocarbon from a geological formation.

AJN may comprise any hydrophobic group that may functionalize with a graphene oxide moiety including but not limited to: alkyl, substituted alkyl, alkenyl, substituted alkenyl, alkynyl, substituted alkynyl, alkoxy, substituted alkoxy, amino, substituted amino, acyl, carboxyl, carboxyl ester, acylamino, alkylamide, substituted alkylamide, aryl, substituted aryl, heteroaryl, substituted heteroaryl, cycloalkyl, substituted cycloalkyl, heterocyclyl, and substituted heterocyclyl; substituted or unsubstituted C1 to C30 alkyl group, a substituted or unsubstituted C1 to C30 arylalkylene ether group, a substituted or unsubstituted C1 to C30 haloalkyl group, a substituted or unsubstituted C1 to C30 alkenyl group, or a combination thereof, wherein "Alkyl" may refer to monovalent saturated aliphatic hydrocarbyl groups having from 1 to 10 carbon atoms and such as 1 to 6 carbon atoms, or 1 to 5, or 1 to 4, or 1 to 3 carbon atoms. This term includes, by way of example, linear and branched hydrocarbyl groups such as methyl ($CH_3$-), ethyl ($CH_3CH_2$-), n-propyl ($CH_3CH_2CH_2$-), isopropyl (($CH_3)_2CH$—), n-butyl ($CH_3CH_2CH_2CH_2$-), isobutyl (($CH_3)_2CHCH_2$-), sec-butyl (($CH_3$)($CH_3CH_2$)CH—), t-butyl (($CH_3)_3C$—), n-pentyl ($CH_3CH_2CH_2CH_2CH_2$-), and neopentyl (($CH_3)_3CCH_2$-); and wherein the term "substituted alkyl" may refer to an alkyl group as defined herein wherein one or more carbon atoms in the alkyl chain (except the $C_1$ carbon) have been optionally replaced with a heteroatom such as —O—, —N—, —S—, —S(O)$_n$- (where n is 0 to 2), —NR— (where R is hydrogen or alkyl) and having from 1 to 5 substituents selected from the group consisting of alkoxy, substituted alkoxy, cycloalkyl, substituted cycloalkyl, cycloalkenyl, substituted cycloalkenyl, acyl, acylamino, acyloxy, amino, aminoacyl, aminoacyloxy, oxyaminoacyl, azido, cyano, halogen, hydroxyl, oxo, thioketo, carboxyl, carboxylalkyl, thioaryloxy, thioheteroaryloxy, thioheterocyclooxy, thiol, thioalkoxy, substituted thioalkoxy, aryl, aryloxy, heteroaryl, heteroaryloxy, heterocyclyl, heterocyclooxy, hydroxyamino, alkoxyamino, nitro, —SO-alkyl, —SO-aryl, —SO-heteroaryl, —SO$_2$-alkyl, —SO$_2$-aryl, —SO$_2$-heteroaryl, and —NR$^a$R$^b$, wherein R' and R" may be the same or different and are chosen from hydrogen, optionally substituted alkyl, cycloalkyl, alkenyl, cycloalkenyl, alkynyl, aryl, heteroaryl and heterocyclic; and wherein "Aryl" or "Ar" may refer to a monovalent aromatic carbocyclic group of from 6 to 18 carbon atoms having a single ring (such as is present in a phenyl group) or a ring system having multiple condensed rings (examples of such aromatic ring systems include naphthyl, anthryl and indanyl) which condensed rings may or may not be aromatic, provided that the point of attachment is through an atom of an aromatic ring. This term includes, by way of example, phenyl and naphthyl. Unless otherwise constrained by the definition for the aryl substituent, such aryl groups can optionally be substituted with from 1 to 5 substituents, or from 1 to 3 substituents, selected from acyloxy, hydroxy, thiol, acyl, alkyl, alkoxy, alkenyl, alkynyl, cycloalkyl, cycloalkenyl, substituted alkyl, substituted alkoxy, substituted alkenyl, substituted alkynyl, substituted cycloalkyl, substituted cycloalkenyl, amino, substituted amino, aminoacyl, acylamino, alkaryl, aryl, aryloxy, azido, carboxyl, carboxylalkyl, cyano, halogen, nitro, heteroaryl, heteroaryloxy, heterocyclyl, heterocloooxy, aminoacyloxy, oxyacylamino, thioalkoxy, substituted thioalkoxy, thioaryloxy, thioheteroaryloxy, —SO-alkyl, —SO-substituted alkyl, —SO-aryl, —SO-heteroaryl, —SO.sub.2-alkyl, —SO.sub.2-substituted alkyl, —SO.sub.2-aryl, —SO.sub.2-heteroaryl and trihalomethyl. Further, AJN's may comprise analogous hydrophilic groups that may also functionalize by the moieties and methods described herein.

The foregoing has outlined rather broadly certain of the features of the exemplary embodiments of the present invention in order that the detailed description that follows may be better understood. It should be appreciated by those skilled in the art that the conception and the specific embodiments disclosed may be readily utilized as a basis for modifying or designing other methods and structures for carrying out the same purposes of the invention that is claimed below.

DETAILED DESCRIPTION OF DISCLOSED EXEMPLARY EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques below, including the exemplary designs and implementations illustrated and described herein, but may be modified within the scope of the appended claims along with their full scope of equivalents.

The following discussion is directed to various exemplary embodiments of the disclosure. One skilled in the art will understand that the following description has broad application, and the discussion of any embodiment is meant only to be exemplary of that embodiment, and that the scope of this disclosure, including the claims set out below, is not limited to that embodiment.

The drawing figures are not necessarily to scale. Certain features and components herein may be shown exaggerated in scale or in somewhat schematic form and some details of conventional elements may be omitted in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first component or device couples to a second, that connection may be through a direct engagement between the two components or devices, or through an indirect connection that is made via other intermediate devices and connections. As used herein, the term "about," when used in conjunction with a percentage or other numerical amount, means plus or minus 10% of that percentage or other numerical amount. For example, the term "about 80%," would encompass 80% plus or minus 8%. As used herein the terminology instrument, apparatus, and device may be used interchangeably. All papers, publications and other references cited herein are hereby incorporated by reference in their entirety:

Overview

Figure 1:
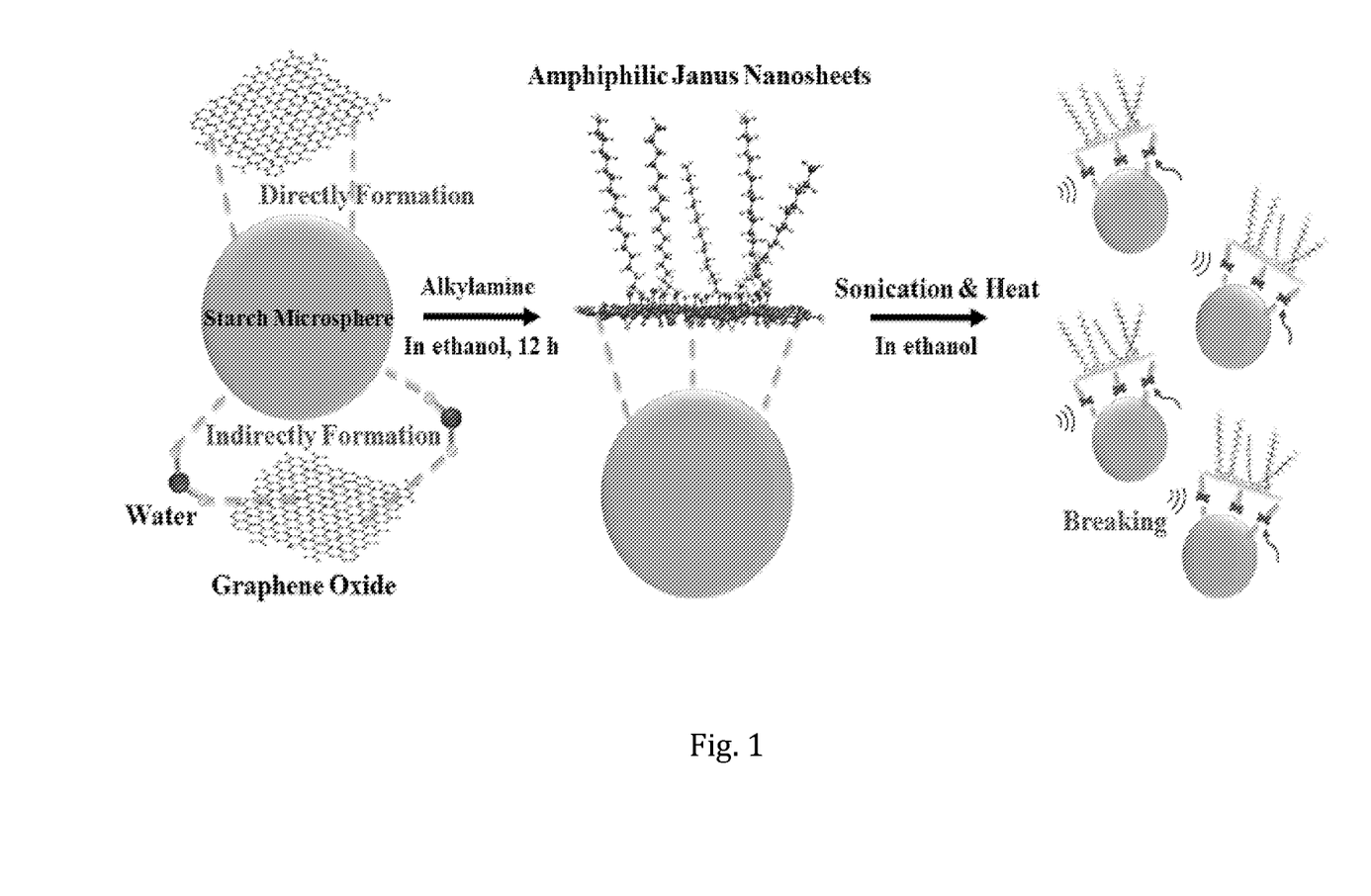
FIG. 1 depicts an illustration of the synthesis of graphene-based amphiphilic Janus nanosheets by manipulating the hydrogen bonding.
Figure 2:
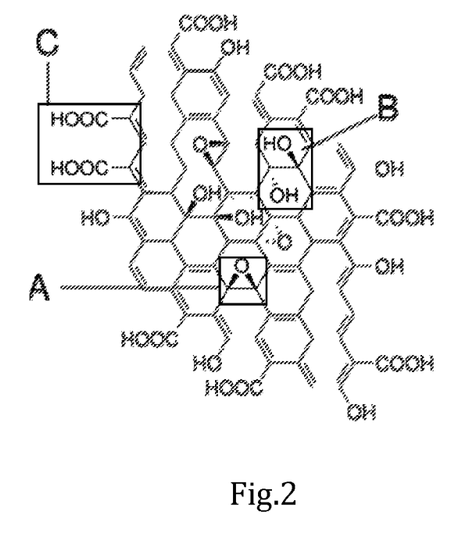
FIG. 2 depicts a two dimensional graphene oxide.

Disclosed herein are embodiments of methods to produce graphene-based amphiphilic Janus nanosheets. In some embodiments disclosed herein, a highly scalable method to synthesize graphene-based amphiphilic Janus nanosheets by manipulating hydrogen bonding is provided. As shown in FIG. 1 by mixing GO and tapioca starch microspheres in water for a few hours at room temperature, GO is immobilized on the surface of tapioca starch microspheres through formation of hydrogen bonds. After successive washing with water and ethanol, the single-side surface hydrophobization of GO was conducted with alkylamine in ethanol. After washing, the release of AJN from the surface of starch microspheres was performed in ethanol via sonication and heating, and the mixture was then separated into two phases with starch microspheres at the bottom portion and AJN dispersed in ethanol at the upper portion. In comparison with the previous method, no organic solvent was demanded to dissolve starch microspheres and the separated starch microspheres can be easily recycled. Moreover, the starch microspheres were natural products at a low cost. With a much higher yield of around 70% (considering GO feeding), we anticipate that other than preparation of graphene-based amphiphilic Janus nanosheets, this method would apply to production of a wide range of amphiphilic Janus particles.

Graphene Oxide (GO).

The synthesis of graphene oxide (GO) mainly followed the Tour's method. In details, 3 g graphite powder was stirred with 360 mL sulfuric acid and 40 mL phosphoric acid for a few minutes. 18 g potassium permanganates (KMnO4) was slowly added into the mixture and followed by putting the fluid system in a water bath, keeping mild stirring at 45° C. for at least 14 hours. After that, the system was transferred to an ice bath with pouring into 300 mL DI water. 3 mL 30 wt % Hydrogen peroxide (H2O2) solution was then injected and the fluid system immediately changed to yellow color. With successively filtration and washing with 5 wt % HCl and DI water until pH reached to 5, the dispersion was subjected to strong sonication for 1 hour for exfoliation. After drying, solid GO can be obtained.

Graphene-Based Amphiphilic Janus Nanosheets (AJN).

40 g white tapioca starch powder was mixed with 250 mL DI water keeping continuously stirring. After sonication for a while, 100 mg GO well dispersed in 100 mL DI water. The dispersion was then slowly added into the starch-in-water mixture and the fluid system maintained stirring for 8 hours. After washing with DI water and ethanol, the starch microspheres were added into 200 mL absolute ethanol solution, followed by adding 300 mg alkylamine dissolved in 50 mL absolute ethanol. The reaction was performed by mild stirring for 12 hours at room temperature. After washing with ethanol, the starch microspheres were again dispersed in absolute ethanol and alternatively subjected to sonication and heat bath for a few times. The fluid system separated into two phases. AJN was dispersed in upper phase. After filtration and drying, about 70 mg AJN can be acquired.

EXAMPLES

Figure 3:
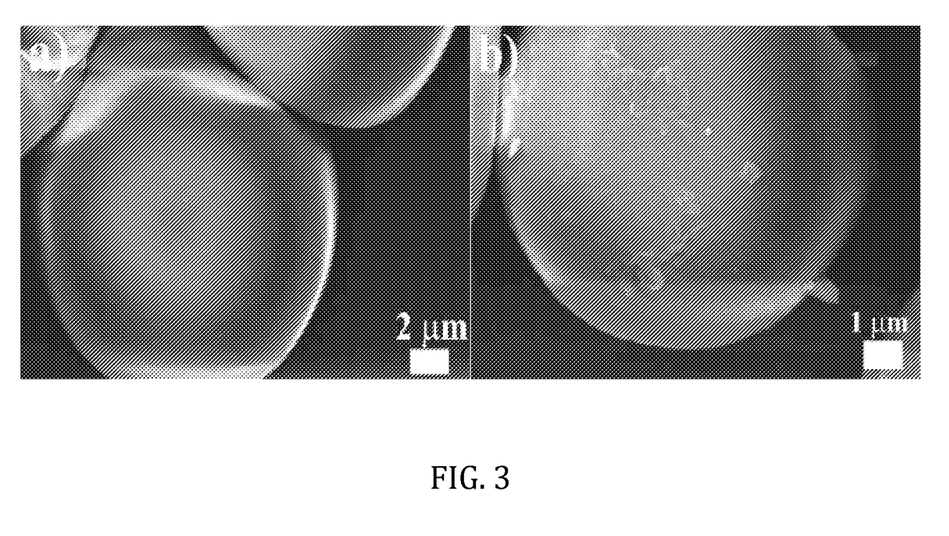
FIG. 3: depicts SEM images, a) Tapioca starch microspheres; b) Graphene Oxide (GO) on the surface of tapioca starch microspheres.

FIG. 3. SEM images A) tapioca starch microspheres; B) graphene oxide (GO) on the surface of tapioca starch microspheres.

The attachment of GO on the surfaces of tapioca starch microspheres in aqueous solution is in some embodiments due to either direct hydrogen bonding between GO and starch particles or indirect bonding with a layer of water between them. However, after washing with ethanol, the layer of water may be extracted to the bulk ethanol phase, leaving all GO directly bond to the starch microspheres. the formation of hydrogen bonds occurred because of the interaction among oxygen functional groups presented on both surfaces of GO and starch microspheres as depicted in FIG. 3, SEM images show smooth surfaces of tapioca starch microspheres before mixing with GO but wrinkles appeared after GO is attached.

Figure 4:
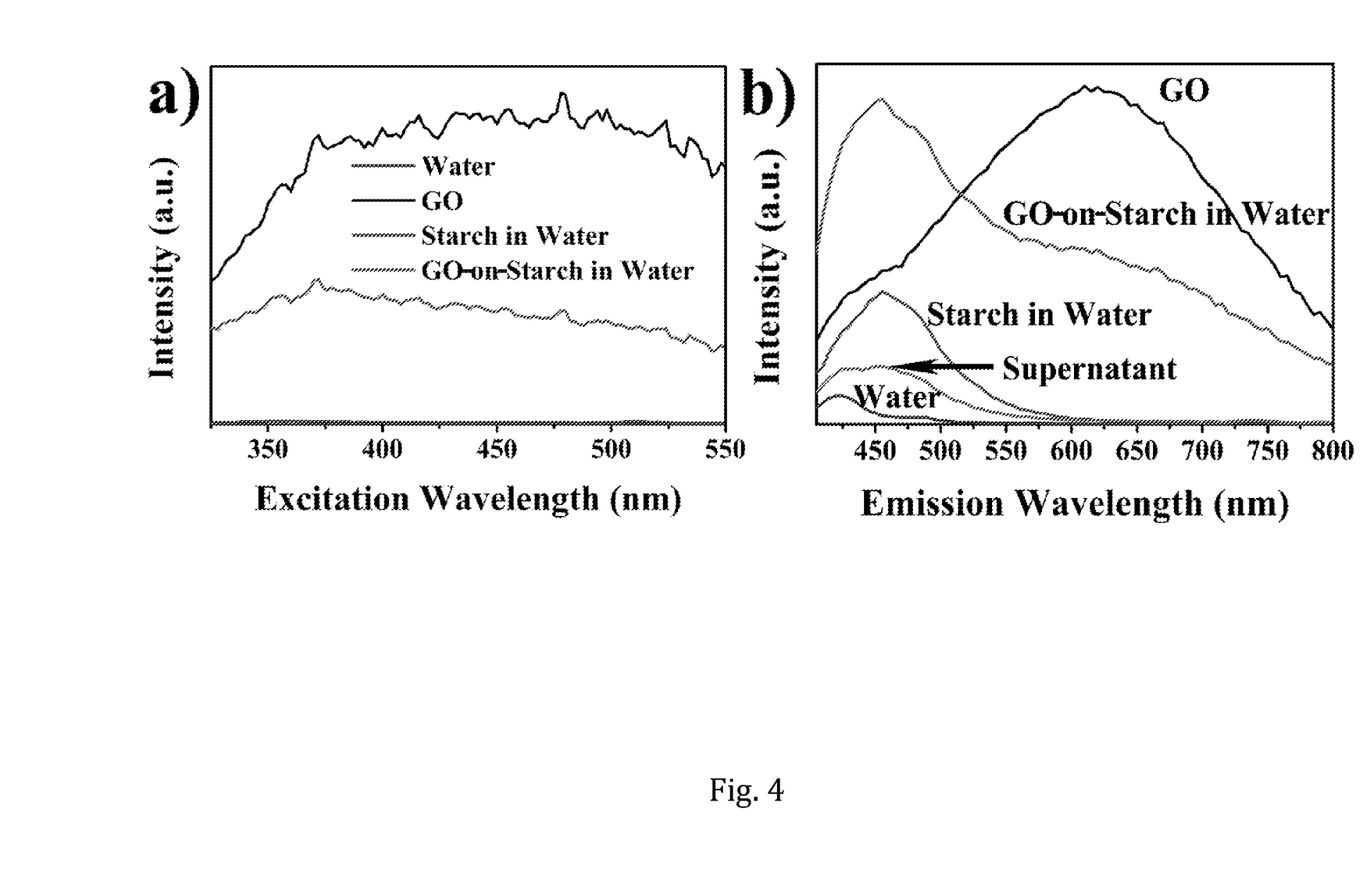
FIG. 4. Fluorescent measurement. a) Excitation scan at 620 nm emission wavelength; b) Emission scan at 370 nm excitation wavelength.

Further, to demonstrate the successful immobilization of GO, a fluorescence microscope was employed to detect the fluorescent signal of GO before and after stirring with starch microspheres. Since GO has broad emission band between 400 nm and 800 nm, an excitation scan at 620 nm emission wavelength was firstly chosen to find the proper excitation wavelength. As shown in FIG. 4 (a), the spectra of water and pure starch in water almost overlaps with the x-axis due to the low intensity. Both GO and GO mixed with starch (i.e., GO-on-starch) displayed peak absorption at the wavelength of around 370 nm, which was determined as the excitation wavelength for emission scan. As shown in FIG. 4 (b). GO exhibited a wide emission band as reported. In contrast to pure starch in water, the spectrum of GO on starch showed a distinct shoulder centered at approximately 640 nm, very close to GO emission peak at around 635 nm. On the contrary, after GO-on-starch dispersion went through low speed centrifugation, the supernatant gave no observable emission in the same region. Instead its emission curve was very similar those of starch dispersion or water. This confirms that the washing process was complete. Thus, all the GO present in the system was attached to starch particles rather than dispersed in water phase.

Figure 5:
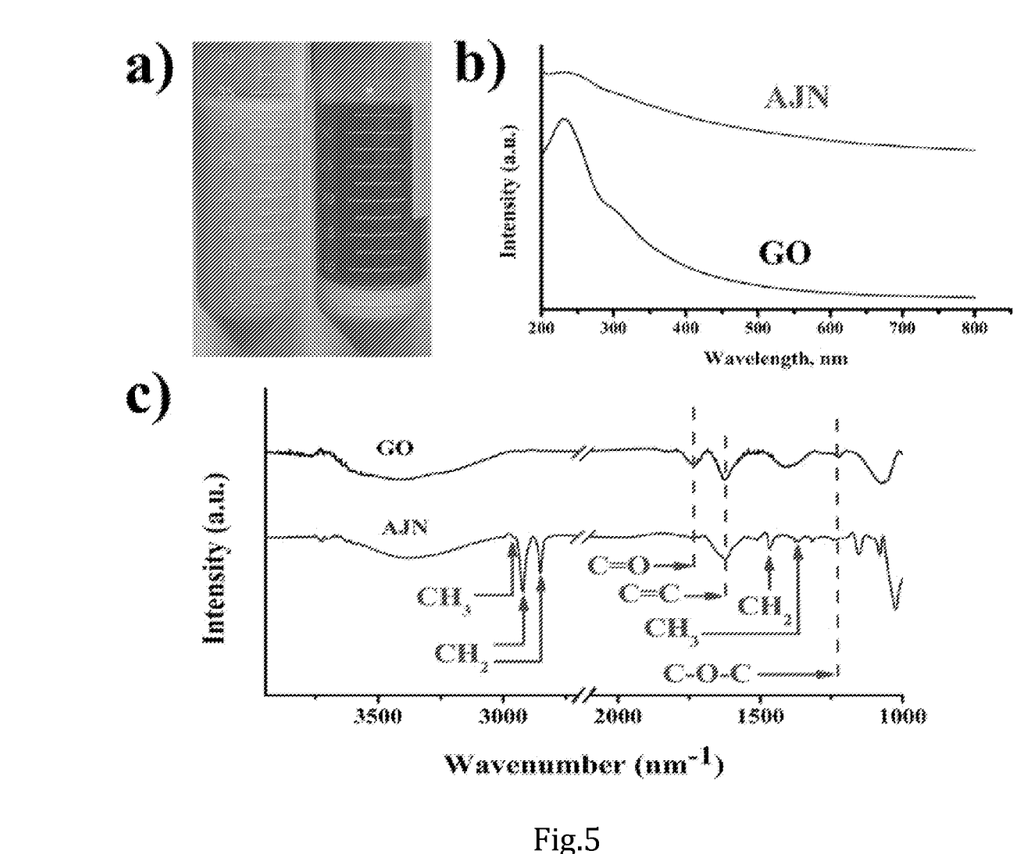
FIG. 5. a) Visual comparison before and after releasing graphene-based amphiphilic Janus nanosheets (AJN); b) UV-Vis spectra of GO and AJN; c) FTIR spectra of GO and AJN.

FIG. 4. Fluorescent measurement. a) excitation scan at 620 nm emission wavelength; b) emission scan at 370 nm excitation wavelength; FIG. 5. a) visual comparison before and after releasing graphene-based amphiphilic Janus nanosheets (AJN); b) uv-vis spectra of GO and AJN; c) FTIR spectra of GO and AJN. single-side surface conjugation of alkylamine was then carried out to synthesize AJN after immobilization GO via nucleophilic substitution reaction (Dreyer, D. R.; Park, S.; Bielawski, C. W.; Ruoff, R. S. Chem. Soc. Rev., 2010, 39, 228) the releasing of AJN was achieved by breaking the hydrogen bonding under sonication and elevated temperature in non-aqueous environment. As depicted in FIG. 5 (a), the fluid system before ultrasound (one phase) and after ultrasound (separation into two phases). The bottom portion was solid starch micro spheres due to its higher density than ethanol. The AJN was dispersed in the upper portion with further filtration and drying, the AJNs were obtained.

UV-VIS spectrum of AJN, shown in FIG. 5 (b), is distinguishable from that of GO. the shoulder of GO at about 300 nm, which is caused by the n-n* transitions of C=O bonds in oxygen-containing groups, became less distinct and the main peak of AJN was also red-shifted from GO's which should be at 230 nm due to $\pi$-$\pi$ transitions of graphitic C=C bonds (Zhang, J.; Yang, H.; Shen, G.; Cheng, P.; Zhang, J.; Guo, S.; Chem. Commun., 2010, 46, 1112). The reason of the difference was because of the functionalization of alkylamine leading to partial restoration of graphitic SP2 network of GO. FTIR further demonstrated the surface conjugation of GO. Except the peaks of epoxy at 1230 cm$^{-1}$, aromatic at 1620 cm$^{-1}$, and carbonyl/carboxyl at 1730 cm$^{-1}$ for both GO and AJN (Verma, S.; Mungse, H. P.; Kumar, N.; Choudhary, S.; Jain, S. L.; Sain, B.; Khatri, O. P. Chem. Commun., 2011, 47, 12673) AJN additionally exhibited strong asymmetric peaks of methylene groups, which are at 2850 cm$^{-1}$ and 2920 cm$^{-1}$, as well as the medium peak at 1463 cm$^{-1}$. The weak signals at 1380 cm$^{-1}$ and 2960 cm$^{-1}$ also indicated methyl groups, showing the introduction of alkyl chains to the GO surface.

Figure 6:
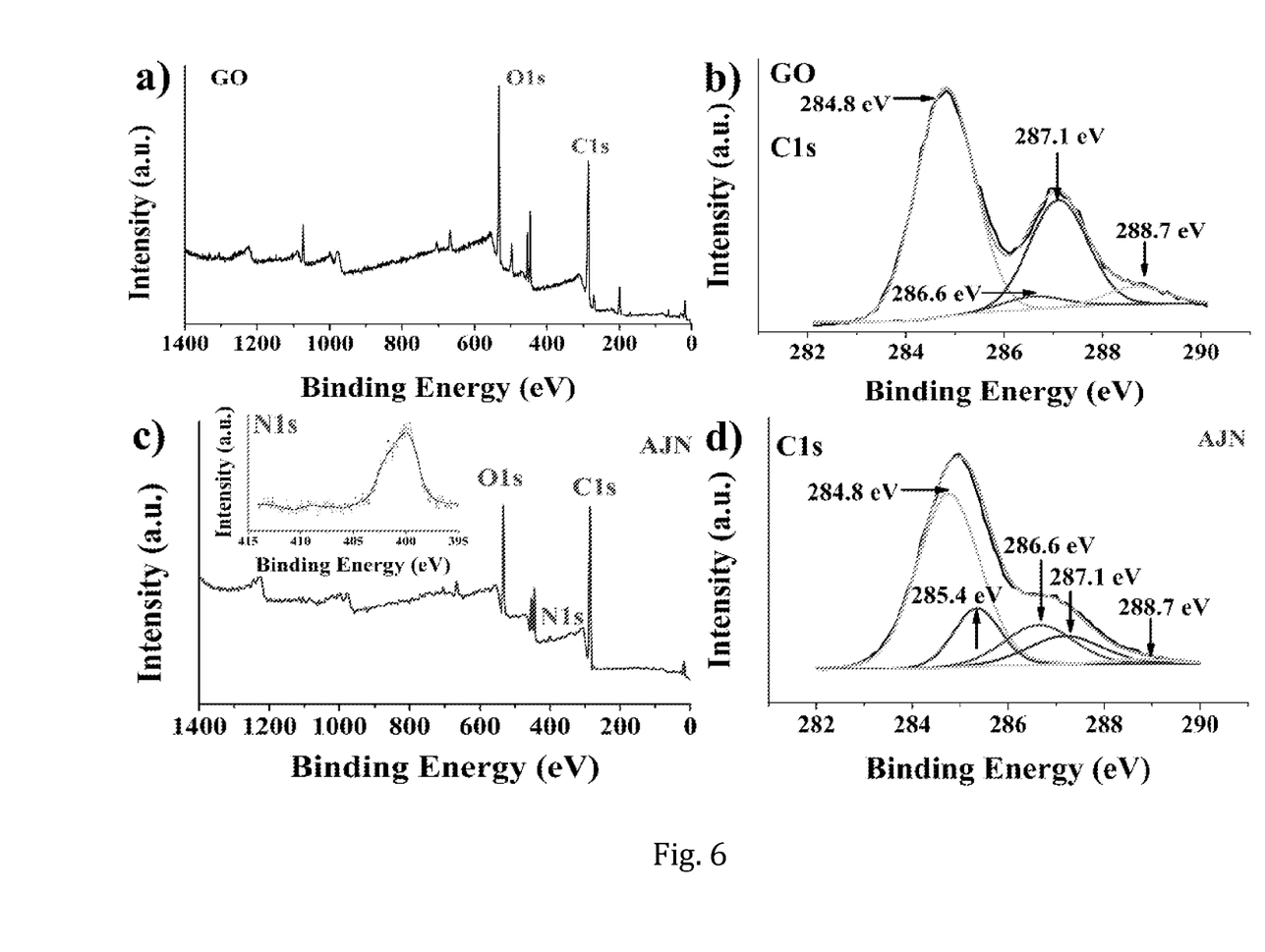
FIG. 6. XPS spectra of Graphene Oxide (GO) and Graphene-based amphiphilic Janus nanosheets (AJN). a) Full spectrum of GO; b) Fitted peaks of c1s spectrum for GO; c) Full spectrum of AJN with an inserted picture showing the feature at the range of N1s; d) Fitted peaks of c1s spectrum for AJN.

The chemical information of GO and AJN were also measured by XPS as shown in FIG. 6. compared with GO (FIG. 6 (a)), AJN presented an additional peak around 400 eV (FIG. 6 (c)), which can be assigned as n1s due to the conjugation with alkylamine. After Gaussian convolution of c1s spectrum using a Shirley background, GO displayed four peaks, which were at 284.8 eV (—C—C—), 286.6 ev (—C—OH), 287.1 eV (—C—O—C—), and 288.8 eV (—O—C=O) as described in FIG. 6 (b). However, AJN yielded an extra peak at 285.4 eV (—C—N—) as shown in FIG. 6 (d), which again demonstrated the successful functionalization of alkylamine.

FIG. 6. XPS spectra of graphene oxide (GO) and graphene-based amphiphilic Janus nanosheets (AJN). a) full spectrum of GO; b) fitted peaks of c1s spectrum for GO; c) full spectrum of AJN with an inserted picture showing the feature at the range of n1 s; d) fitted peaks of c1s spectrum for AJN.

Figure 7:
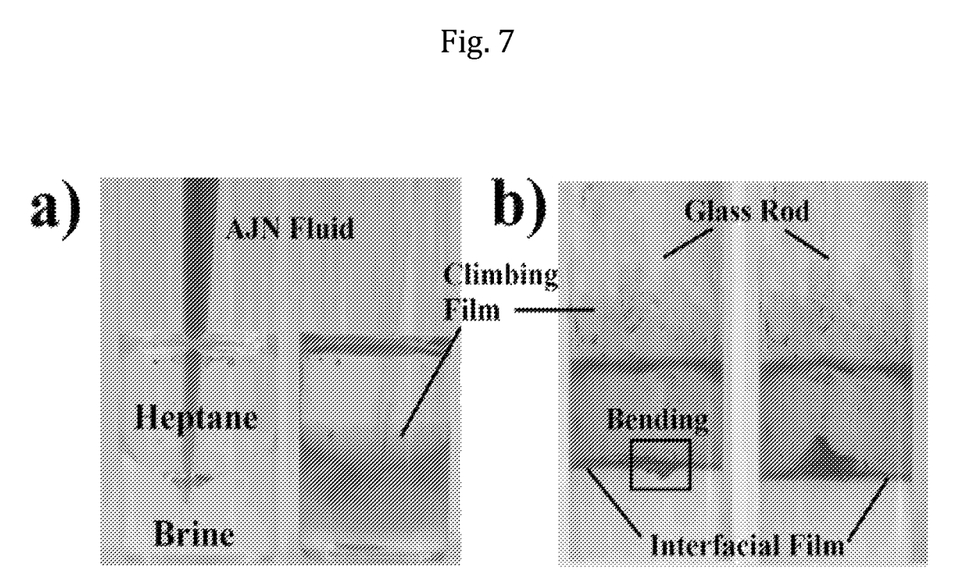
FIG. 7 Amphiphilicity testing of the nanofluid containing graphene-based amphiphilic Janus nanosheets (AJN). a) Injection of AJN in heptane and brine (containing 4 wt % NaCl and 1 wt % $CaCl_2$) system; b) Elasticity testing by intrusion with a glass rod as disclosed herein.

AJN was dispersed in DI water to form the nanofluid after sonication for a few hours with the assistance of adding a little amount of ethanol. The amphiphilicity property was then tested by injecting the nanofluid into heptane and brine (containing 4 wt % NaCl and 1 wt % CaCl$_2$) system. as shown in FIG. 7 (a), the nanosheets spontaneously went to heptane-brine interface, exactly as what was observed before (Luo, D.; Wang, F.; Zhu, J. Y.; Cao, F.; Liu, Y.; Li, X. G.; Willson, R. C.; Yang, Z. Z.; Chu, C. W.; Ren, Z. F. P. Natl. Acad. Sci. U.S.A. 2016, 113, 7711) this was due to the salt screening of the hydrophilic side of AJN and the attractive force between heptane phase and hydrophobic side of AJN became the dominant interaction. once the full monolayer coverage of the interfacial area by AJN, the successive injected AJN induced the concentration gradient between two phase (heptane and brine phases) area and three phase (heptane, brine and solid glass phases) contact region, thus generated the marangoni stress which transferred AJN to form climbing film like the behavior of molecular surfactant and other nanoparticles (Nikolov, A. D.; Wasan, D. T.; Chengara, A.; Koczo, K.; Policello, G. A.; Kolossvary, I. Adv. Colloid Interface Sci., 2002, 96, 325; and Binks, B. P.; Clint, J. H.; Fletcher, P. D. I.; Lees, T. J. G.; Taylor, P. Langmuir, 2006, 22, 4100) with vigorous shaking of the glass vial, an interfacial film appeared.

When subjected to intrusion of a glass rod, the film was bent but did not break, indicating certain elasticity. These observations are the similar with the previously reported graphene-based amphiphilic Janus nanosheets which were fabricated by wax masking method. Therefore, in some embodiments, it clearly demonstrated the amphiphilic nature of AJN prepared by this method. FIG. 7. Amphiphilicity testing of the nanofluid containing graphene-based amphiphilic Janus nanosheets (AJN). a) injection of AJN in heptane and brine (containing 4 wt % NaCl and 1 wt % CaCl$_2$) system; B) elasticity testing by intrusion with a glass rod.

In some embodiments, a more efficient method to synthesize graphene-based amphiphilic Janus nanosheets are disclosed, wherein the formation of hydrogen bonds immobilizes graphene oxide (GO) on the surface of tapioca starch microspheres for subsequent hydrophobization using alkylamine. In some embodiments, the hydrogen bonds where subsequently broken, and amphiphilic Janus nanosheets formed from the surfaces. In some embodiments, this method is highly facile and scalable, in comparison with a wax in water emulsion template masking method, in part because there is no need to dissolve wax templates with large amounts of organic solvents, which lowers the production costs of the currently disclosed method.

What is claimed is:

1. A method of making a graphene-based Amphiphilic Janus Nanosheet (AJN), comprising:
   (a) mixing graphene oxide (GO) and starch microspheres in water, and forming a GO-on-starch microsphere;
   (b) hydrophobizing a first surface of the GO-on-starch microsphere and forming a hydrophobized GO-on-starch microsphere; and
   (c) releasing the starch microsphere from the hydrophobized GO-on-starch microsphere and forming an Amphiphilic Janus Nanosheet (AJN), wherein the AJN is in at least a 70% yield.

2. The method of claim 1, wherein said graphene oxide is two dimensional.

3. The method of claim 2, wherein said graphene oxide is a sheet.

4. The method of claim 1, wherein said forming a GO-on-starch microsphere is by immobilizing said GO to the starch microsphere by hydrogen bonding.

5. The method of claim 1, wherein said starch microspheres are tapioca starch microspheres.

6. The method of claim 1, wherein said mixing graphene oxide (GO) and starch microspheres in water, is for 1-20 hours at room temperature.

7. The method of claim 1, further comprises washing said GO-on-starch microsphere with water and ethanol prior to step (c).

8. The method of claim 1, wherein said hydrophobizing comprises conjugating alkylamine to a single-side surface of the GO-on-starch microsphere.

9. The method of claim 8, wherein said hydrophobizing comprises conjugating of alkylamine to GO-on-starch by a nucleophilic substitution.

10. The method of claim 1, wherein releasing further comprises sonication and heating.

11. The method of claim 1, further comprising after step (c) separating said starch microspheres from said Amphiphilic Janus Nanosheet (AJN) by phase separation in ethanol.

12. The method of claim 11, wherein said releasing is in a non-aqueous environment.

13. The method of claim 11, further comprising conjugating a hydrophilic species to said Amphiphilic Janus Nanosheet (AJN).

14. The method of claim 1, further comprising adding the Amphiphilic Janus Nanosheet to a first solvent to form an Amphiphilic Janus Nanosheet nanofluid.

15. An Amphiphilic Janus Nanosheet (AJN) wherein said AJN comprises:
   a two dimensional graphene oxide sheet, wherein said graphene oxide sheet comprises:
   a first surface, and
   a second surface, wherein said first surface comprises at least one of a first functionalized oxygen-rich functional group or a second functionalized oxygen-rich functional group; and said second face comprises at least one of the first functionalized oxygen-rich functional group, or the second functionalized oxygen-rich functional group, and wherein said first functionalized oxygen-rich functional group and the second functionalized oxygen-rich functional group are one of a hydrophobic group or a hydrophilic group,
   wherein the AJN is characterized by x-ray photoelectron spectroscopy (XPS) peaks indicative of —C—C—, —C—OH, —C—O—C—, and —O—C═O.

16. A surfactant, comprising the Amphiphilic Janus Nanosheet (AJN) of claim 15, and a solvent, wherein said surfactant forms a climbing film in an oil/water mixture.

17. The surfactant of claim 16, wherein the oil/water mixture is a hydrocarbon/brine solution.

18. The surfactant of claim 16, wherein said surfactant forms an elastic interfacial film at a hydrophobic/hydrophilic interface.

19. The surfactant of claim 18, wherein said elastic interfacial film at said hydrophobic/hydrophilic interface releases said hydrocarbon from a geological formation.

20. A surfactant of claim 16, wherein said climbing film is formed in a geologic formation comprising a hydrocarbon.

* * * * *